E. J. ROHNE.
ELECTRIC SOLDERING IRON.
APPLICATION FILED APR. 29, 1916.
1,308,994.
Patented July 8, 1919.
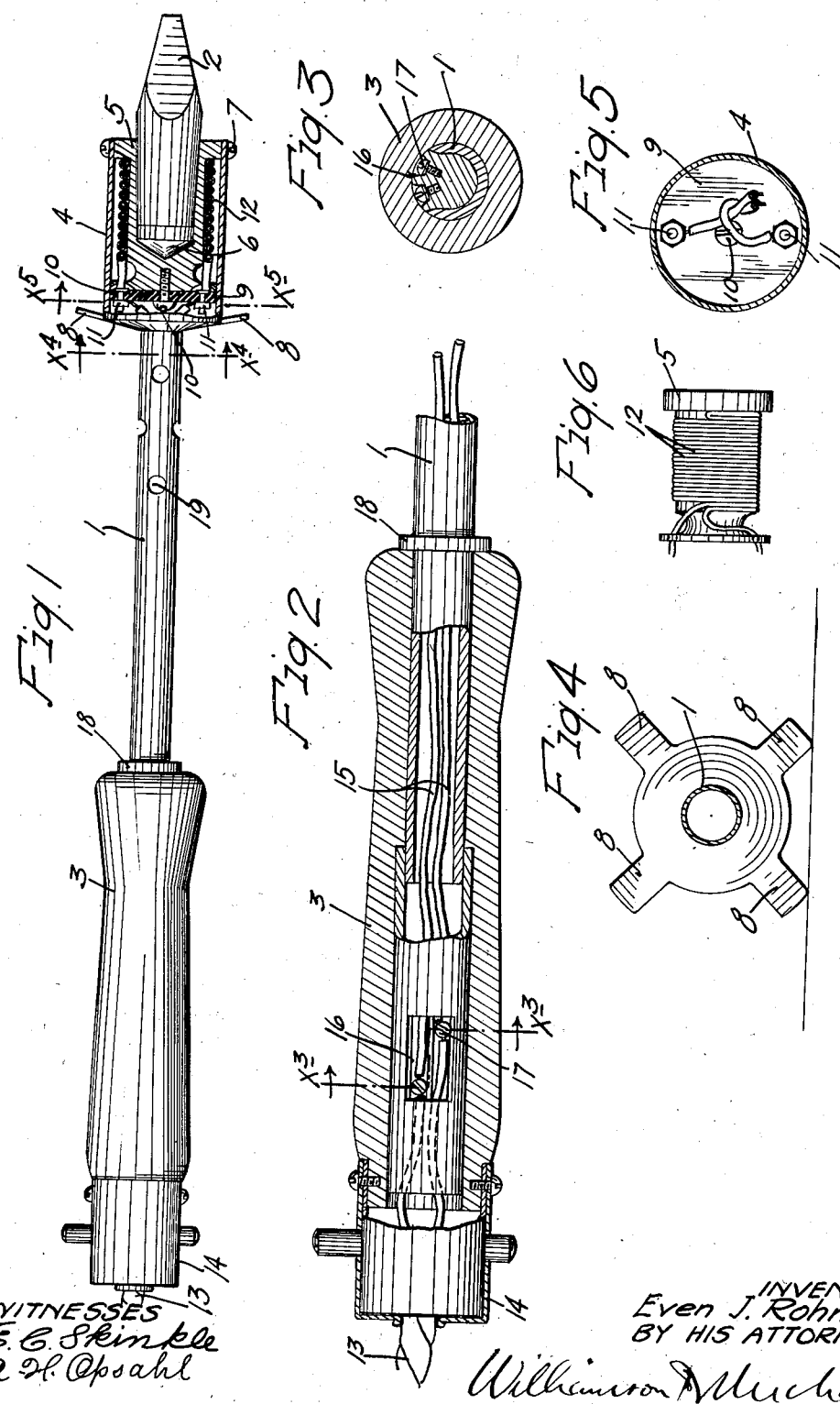
WITNESSES
E. C. Skinkle
A. H. Opsahl
INVENTOR
Even J. Rohne
BY HIS ATTORNEYS
Williamson & Merchant

UNITED STATES PATENT OFFICE.

EVEN J. ROHNE, OF MINNEAPOLIS, MINNESOTA.

ELECTRIC SOLDERING-IRON.

1,308,994.   Specification of Letters Patent.   Patented July 8, 1919.

Application filed April 29, 1916. Serial No. 94,285.

*To all whom it may concern:*

Be it known that I, EVEN J. ROHNE, a citizen of the United States, residing at Minneapolis, in the county of Hennepin and State of Minnesota, have invented certain new and useful Improvements in Electric Soldering-Irons; and I do hereby declare the following to be a full, clear, and exact description of the invention, such as will enable others skilled in the art to which it appertains to make and use the same.

My invention relates to improvements in electric soldering irons; and, to this end, it consists of the novel devices and combinations of devices hereinafter described and defined in the claims.

In the accompanying drawings, which illustrate the invention, like characters indicate like parts throughout the several views.

Referring to the drawings:

Figure 1 is a view of the improved soldering iron principally in side elevation with some parts shown in longitudinal central section;

Fig. 2 is a fragmentary view of the handle end of the soldering iron, on an enlarged scale, some parts being shown in longitudinal central section;

Fig. 3 is a transverse section taken on the irregular line $X^3$ $X^3$ of Fig. 2;

Fig. 4 is a transverse section taken on the line $X^4$ $X^4$ of Fig. 1, on an enlarged scale;

Fig. 5 is a transverse section taken on the line $X^5$ $X^5$ of Fig. 1; and

Fig. 6 is a side elevation of the heating element and body member, removed from the soldering iron.

The numeral 1 indicates a tubular stem detachably holding, at one end, a solder applying element 2, usually designated as the "point" of the soldering iron. This "point" is preferably formed from drawn copper for the reason that it does not oxidize like cast copper. On the other end of the stem 1 is a handle 3, preferably of wood, by which the soldering iron is held. The forward end of the stem 1 is materially expanded to afford a cylindrical casing 4 into the front open end of which is removably telescoped a metallic socket 5 having a tapered recess 6. Into this tapered recess 6, the tapered shank of the "point" 2 is removably inserted.

The socket 5 is made of iron or of material whose coefficient of expansion is less than that of the copper point 2. By such an arrangement the copper "point" 2 may normally loosely fit within the recess 6 and when it is heated it will, by greater expansion, be tightly held in the socket 5. Preferably the socket 5 is of cast steel. The flanges of the socket 5 tightly fit within the casing 4, and said socket is firmly held against endwise movement therefrom by screws 7 passed through holes in the casing 4 and having screw thread engagement with the forward flange of the socket 5. As shown the socket 5 is somewhat shorter than the casing 4 to afford a clearance space for electric wires between the inner end of said socket and the adjacent end of said casing.

Extending radially from the inner end of the casing 4 are four circumferentially spaced legs 8 which, when the soldering iron is laid down, hold the "point" 2 above the support on which the soldering iron rests to prevent burning thereof.

An insulating disk 9 of mica or other suitable material covers the inner end of the socket 5 and a screw 10 detachably secures the same thereto. Secured to this disk 9 and extending therethrough is a pair of diametrically opposite binding posts 11. To these binding posts 11, are secured the ends of a heating element or wire 12. From the binding posts 11 the wire 12 is extended through apertures in the inner flange of the socket 5 and then applied spirally around the metallic socket 5 between the flanges thereof. To prevent the iron socket 5 from acting as the core of a magnet, the heating element 12 is doubled upon itself and coiled around the socket 5, like a double thread. By this arrangement the magnetic action of the socket 5 is neutralized.

The heating element 12 may be, and preferably is, of the type disclosed and claimed in my U. S. Letters Patent, 1,133,579, issued March the 30, 1915, and entitled "Electric heating element".

Lead wires from any suitable source of electrical energy are attached to the contacts of a switch, indicated as an entirety by the numeral 14. The switch 14 is detachably attached by screws to the outer end of the handle 3 and may be of any desired make. A pair of wires 15 connect the switch contact with the binding screws 11. These wires extend through the stem 1 and are laid in grooves formed in an insulating block 16 and secured thereto by binding screws 17. The rear end portion of the stem 1 is expanded and provided with a lateral opening to receive the block 16 which completely fills the said stem, see Fig. 3. A stop collar 18 on the stem 1 limits the telescopical movement of the handle 3, thereon. Obviously, by manipulating the switch 14, the heat at the "point" of the soldering iron may be controlled. Circumferentially and longitudinally spaced air holes 19 are found in the stem 1 close to the casing 4 to assist in keeping the handle end of the stem of the soldering iron cool.

After many experiments with different metals, I have found that cast iron and copper are best suited, respectively, for the socket and "point" of my improved soldering iron for the reason that the cast iron will retain the heat and the copper radiate it. By providing the "point" with a relatively large shank and telescoping the same into the socket, a large heating surface for the "point" is obtained. This large heating surface draws the heat from the socket and delivers the same through the "point" to the work where the heat is needed. Also, by making the heating surface of the "point" large, the heat is drawn from the sockets so fast that it does not pass into the casing and stem and thereby the remainder of the soldering iron is kept cool, which is highly desirable.

The above described soldering iron has been put into commercial use and has proven highly efficient for the purposes had in view.

What I claim is:

1. In an electric soldering iron, the combination with a tubular stem having at one end a "point", of a handle removably mounted on the other end of the stem, a switch secured to the handle, lead wires secured to the switch, a heating element for the "point", wires extending through said stem and connecting the switch to the heating element, said stem having a lateral opening normally covered by said handle, an insulating block mounted in the lateral opening in said stem, and binding screws securing said wires thereto.

2. An electric soldering iron having a metallic socket, a point carried by said socket, and a heating wire folded upon itself and coiled in double parallel arrangement around said socket so that the magnetic action of the core will be neutralized, and lead wires connected to the terminals of said coil.

In testimony whereof I affix my signature in presence of two witnesses.

EVEN J. ROHNE.

Witnesses:
 EVA E. KÖNIG,
 HARRY D. KILGORE.